US011425017B2

(12) United States Patent
Musa

(10) Patent No.: US 11,425,017 B2
(45) Date of Patent: Aug. 23, 2022

(54) SYSTEMS AND METHODS FOR UTILIZING A NEURAL NETWORK MODEL TO PERFORM PACKET CAPTURE DATA ANALYSIS

(71) Applicant: Verizon Patent and Licensing Inc., Basking Ridge, NJ (US)

(72) Inventor: John A. Musa, Potomac Falls, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 16/878,933

(22) Filed: May 20, 2020

(65) Prior Publication Data
US 2021/0367871 A1    Nov. 25, 2021

(51) Int. Cl.
*H04L 43/106* (2022.01)
*H04L 69/322* (2022.01)
*H04L 43/04* (2022.01)
*H04L 67/14* (2022.01)
*H04L 47/2483* (2022.01)
*H04L 69/16* (2022.01)

(52) U.S. Cl.
CPC ............ *H04L 43/106* (2013.01); *H04L 43/04* (2013.01); *H04L 47/2483* (2013.01); *H04L 67/14* (2013.01); *H04L 69/16* (2013.01); *H04L 69/322* (2013.01)

(58) Field of Classification Search
None
See application file for complete search history.

(56) References Cited

U.S. PATENT DOCUMENTS

| 9,143,379 | B1* | 9/2015 | Berger | H04L 69/40 |
| 10,237,875 | B1* | 3/2019 | Romanov | H04L 47/32 |
| 10,264,003 | B1* | 4/2019 | Wu | H04L 41/0681 |
| 11,010,472 | B1* | 5/2021 | Powers | G06F 21/561 |
| 2016/0337383 | A1* | 11/2016 | Durham | H04L 63/0227 |
| 2017/0359264 | A1* | 12/2017 | Bird | H04L 47/2416 |
| 2018/0285750 | A1* | 10/2018 | Purushothaman | G06N 5/045 |
| 2020/0274821 | A1* | 8/2020 | Siracusano | H04L 47/70 |

* cited by examiner

Primary Examiner — Lonnie V Sweet

(57) ABSTRACT

A device may receive packet data identifying packets exchanged between client devices via a network of network devices. The device may classify the packet data based on timestamps and protocols associated with the packets and to generate classified packet data. The device may group the classified packet data into packet data sets corresponding to packet flows between pairs of the client devices. The device may select a packet data set, from the packet data sets, based on one or more filtering criteria. The device may process the packet data set to determine whether the packet data set is associated with one or more problem packets. The device may perform one or more actions based on determining whether the packet data set is associated with one or more problem packets.

16 Claims, 13 Drawing Sheets

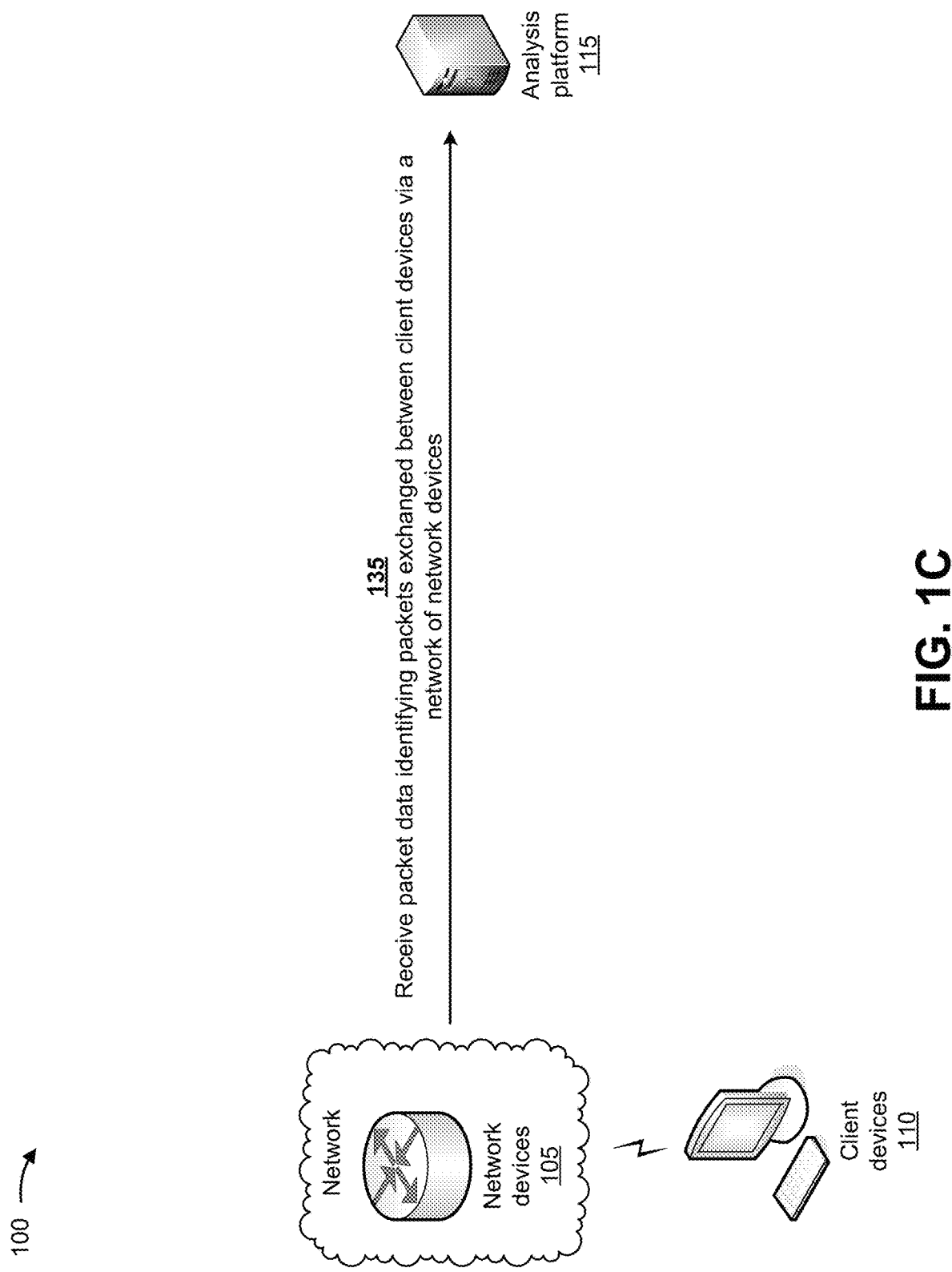

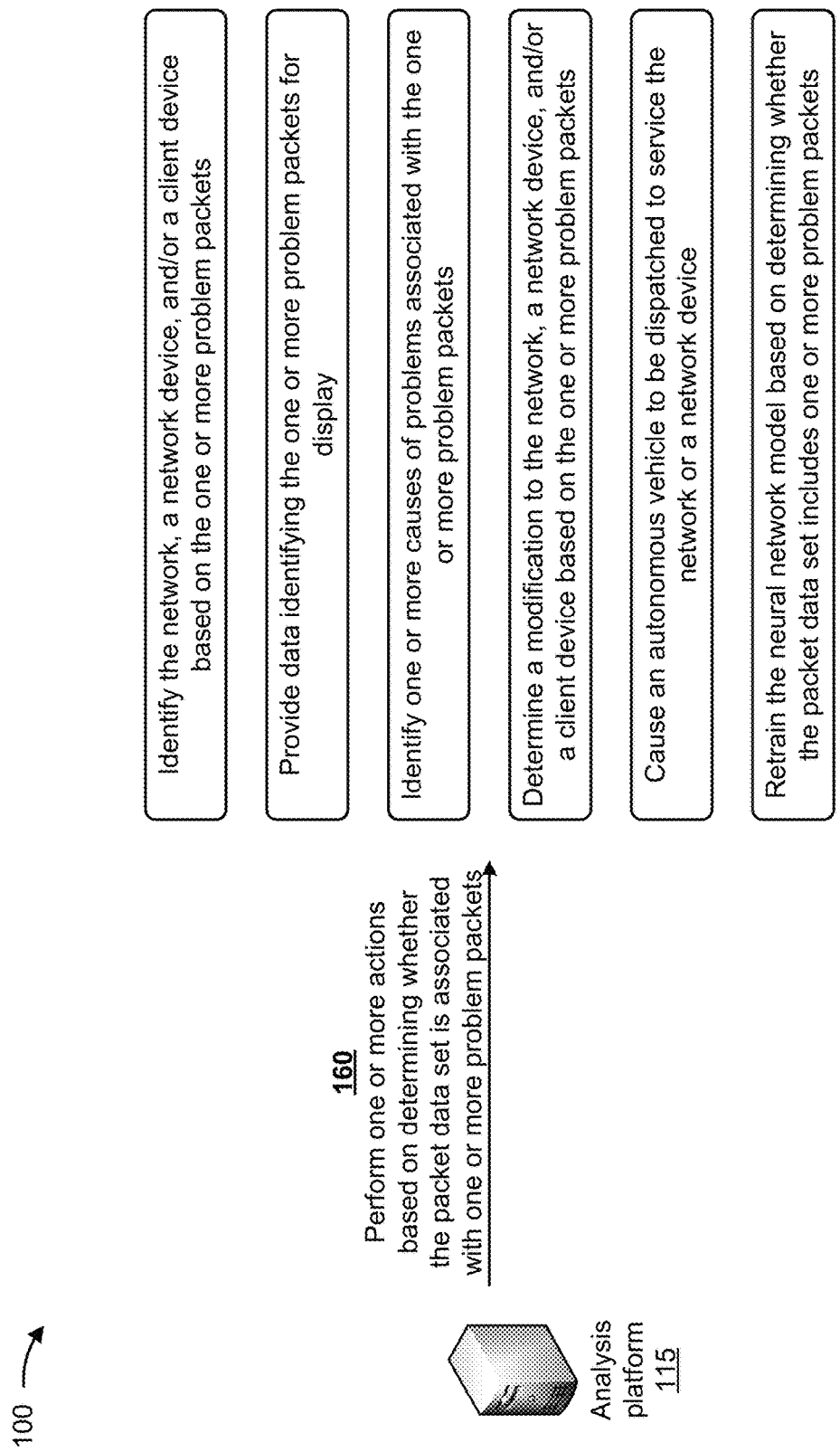

SYSTEMS AND METHODS FOR UTILIZING A NEURAL NETWORK MODEL TO PERFORM PACKET CAPTURE DATA ANALYSIS

BACKGROUND

Packet capture may be employed to intercept one or more data packets at a particular point in a network, such as a network tap. Once a packet is captured, the packet can be stored for later analysis or aggregated into a set that represents a defined protocol traffic flow. For example, the packet may be analyzed to help diagnose and solve network problems.

BRIEF DESCRIPTION OF THE DRAWINGS

FIGS. 1A-1H are diagrams of an example implementation described herein.

DETAILED DESCRIPTION OF PREFERRED EMBODIMENTS

Figure 1A:
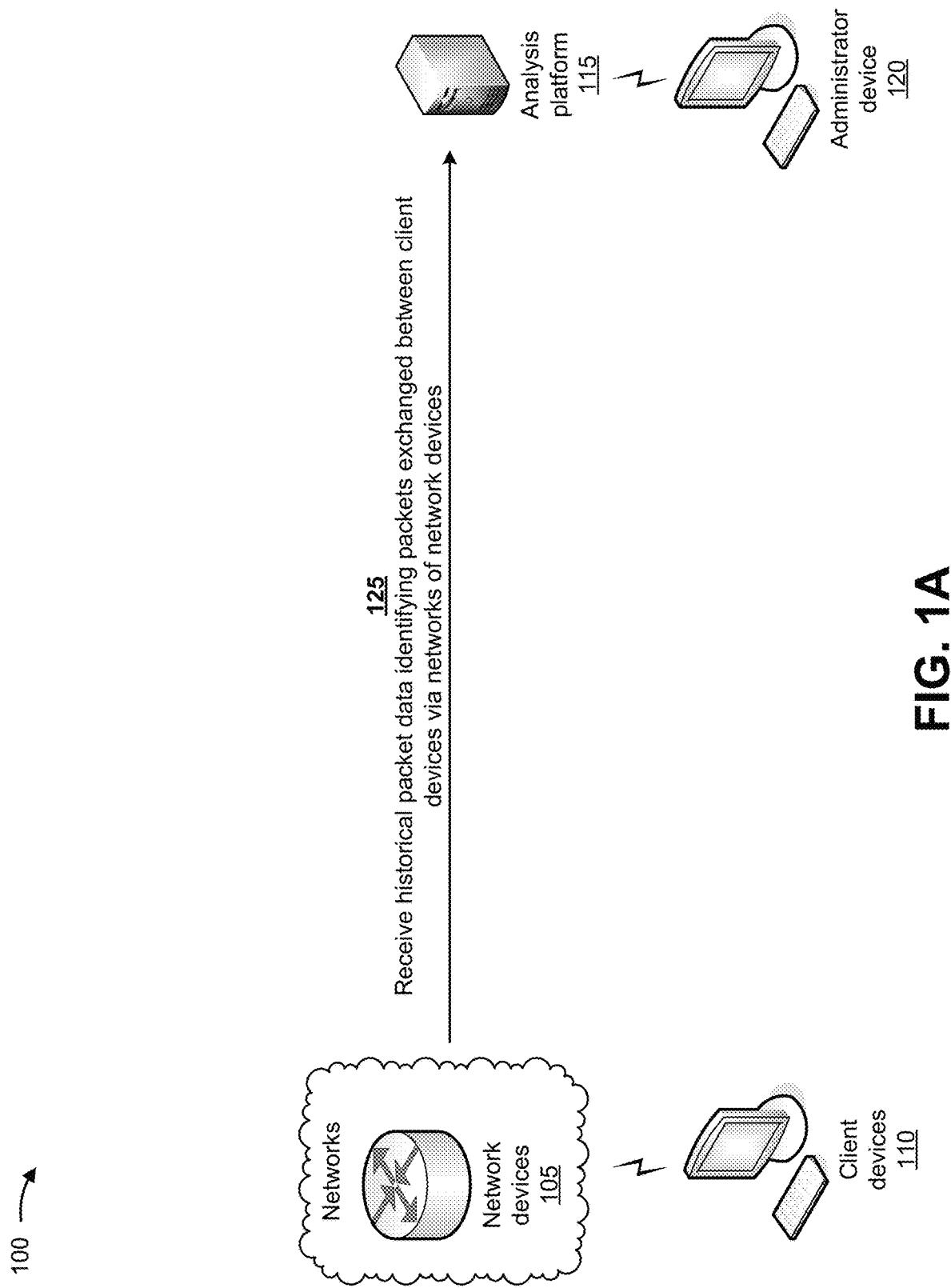

The following detailed description of example implementations refers to the accompanying drawings. The same reference numbers in different drawings may identify the same or similar elements.

A network may have thousands, millions, billions, or more packets that flow through the network and through various points of connectivity via network devices (e.g., routers, switches, servers, and/or the like). A packet or a group of packets that traverse a network may experience many different types of errors, which may result in a traffic flow (e.g., a set of related packets, sometimes referred to as a packet flow) being disrupted. For example, an error may occur at a network device (e.g., that routes or forwards packets through a network) or a client device (e.g., an endpoint for the traffic flow), among other examples. Such errors may include, for example, a software error or failure, a hardware error or failure, a routing error, a protocol error, and/or the like. As an example, a protocol may require specific parameters (e.g., fields) in a header and/or a payload of a packet. There may be hundreds or more of different possible protocols for a traffic flow, and each protocol may be associated with a different set of values or parameters. If a parameter of a protocol of a packet has an incorrect value (e.g., an incorrect type of value for the parameter, a value that is not included in a permitted set or range of values for the parameter, and/or the like), then a traffic flow that includes the packet may be disrupted, performance associated with the traffic flow may be degraded, and/or the like. This may result in errors, longer latency, lower reliability, dropped sessions, and/or dropped calls for the traffic flow.

Due to the large volume of packets that flow through a network, identifying errors associated with individual packets and/or packet protocols may be impossible or impractical. For example, some techniques for identifying such errors may take days, weeks, or months to perform, or may never be performed at all. As a result, the errors cannot be resolved and performance may continue to suffer. Implementations described herein enable a large volume of packets (e.g., thousands, millions, billions, or more) to be analyzed quickly and efficiently. For example, packets may be classified into flows based on timestamps, protocols, endpoint devices, or other packet data, and the flows may be analyzed to identify errors at a flow level, rather than at an individual packet level. This analysis can be used to improve network performance, reduce latency, increase reliability, reduce a quantity of dropped sessions and/or dropped calls, and/or the like. In some implementations, the analysis may be performed in real time to improve performance associated with a traffic flow as the traffic flow is occurring, which may significantly improve performance and reduce errors.

FIGS. 1A-1H are diagrams of an example 100 associated with training and utilizing a neural network model to perform packet capture data analysis. As shown in FIGS. 1A-1H, example 100 includes one or more network devices 105 (e.g., routers, switches, gateways, servers, network traffic transfer devices, and/or the like), one or more client devices 110 (e.g., which may be endpoint devices, in some implementations), an analysis platform 115, and an administrator device 120.

As shown in FIG. 1A, and by reference number 125, the analysis platform 115 may receive historical packet data identifying packets exchanged between client devices 110 via network devices 105. For example, a first pair of client devices 110 may communicate with one another via a network that includes one or more network devices 105, a second pair of client devices 110 may communicate with one another via a network (e.g., the same network or a different network) that includes one or more network devices 105 (e.g., the same network devices 105 or different network devices 105), and so on. Additionally, or alternatively, a first client device 110 may communicate with multiple other client devices 110 via a network that includes one or more network devices 105, a second client device 110 may communicate with multiple other client devices 110 via a network (e.g., the same network or a different network) that includes one or more network devices 105 (e.g., the same network devices 105 or different network devices 105), and so on. Communications between client devices 110 may include one or more packets, such as a group of related packets, sometimes referred to as a traffic flow.

In some implementations, a network device 105 may transmit, to the analysis platform 115, copies of packets transferred (e.g., routed, forwarded, relayed, and/or the like) by the network device 105. In some implementations, a network device 105 may generate copies (e.g., duplicates) of packets and may transmit the copies to the analysis platform 115. The copies may be transmitted as they are generated and thereafter deleted from memory of the network device 105, thereby conserving memory resources of the network device 105. Alternatively, the copies may be stored in memory of the network device 105 and transmitted to the analysis platform 115 periodically and/or based on an event, such as a request received from the analysis platform 115, a traffic volume of the network device 105 falling below a threshold, and/or the like. This may reduce network load when network congestion is high. In some implementations, a client device 110 may transmit, to the analysis platform 115, copies of packets in a similar manner as described above. Additionally, or alternatively, another device, such as a network tap, may capture packets and transmit copies of packets to the analysis platform 115 in a similar manner as described above.

Additionally, or alternatively, a network device 105 may remove information from the transferred packets, and may provide a remaining portion of the packets and/or an indication of the remaining information to the analysis platform 115. For example, the network device 105 may remove a payload from a packet and may transmit a remaining portion of the packet to the network device 105. In some cases, the network device 105 may transmit a header of the packet to the analysis platform 115 without transmitting the payload of the packet to the analysis platform 115. Additionally, or alternatively, the network device 105 may determine (e.g., based on a request transmitted by the analysis platform 115 and/or based on information stored in memory of the network device 105) one or more fields of the packet for which information is to be transmitted. The network device 105 may extract information (e.g., values) from the one or more fields, and may transmit the extracted information to the analysis platform 115 as the information is extracted, periodically, and/or based on an event, as described above. In some implementations, a client device 110 may transmit, to the analysis platform 115, portions of packets and/or information extracted from the packets in a similar manner as described above. In this case, the historical packet data may include portions of packets transferred by the network device 105, information extracted from packets transferred by the network device 105, and/or the like. In some implementations, a client device 110 may transmit, to the analysis platform 115, portions of packets and/or information extracted from packets in a similar manner as described above.

Thus, as described above, the historical packet data may include copies of packets transferred by a network device 105 and/or transmitted or received by a client device 110, portions of packets transferred by a network device 105 and/or transmitted or received by a client device 110, information extracted from packets transferred by a network device 105 and/or transmitted or received by a client device 110, and/or the like. In some implementations, the historical packet data may be associated with information received from administrator device 120 for the purpose of training a machine learning model, such as data indicating whether a set of packets is associated with a problem, a type of problem associated with a set of packets, and/or the like.

Thus, the analysis platform 115 may collect packets, aggregate the collected packets, and then subdivide the collected packets into discrete sets. Each set may represent a particular protocol traffic flow of a unique and distinct conversational session between two conversing endpoints (e.g., client devices 110). The analysis platform may use parameter values in various protocol packet headers to identify the set of packets that form a traffic flow and/or conversational session between the endpoints. The analysis platform 115 may analyze traffic flows and/or conversational sessions, as described in more detail below.

Figure 1B:
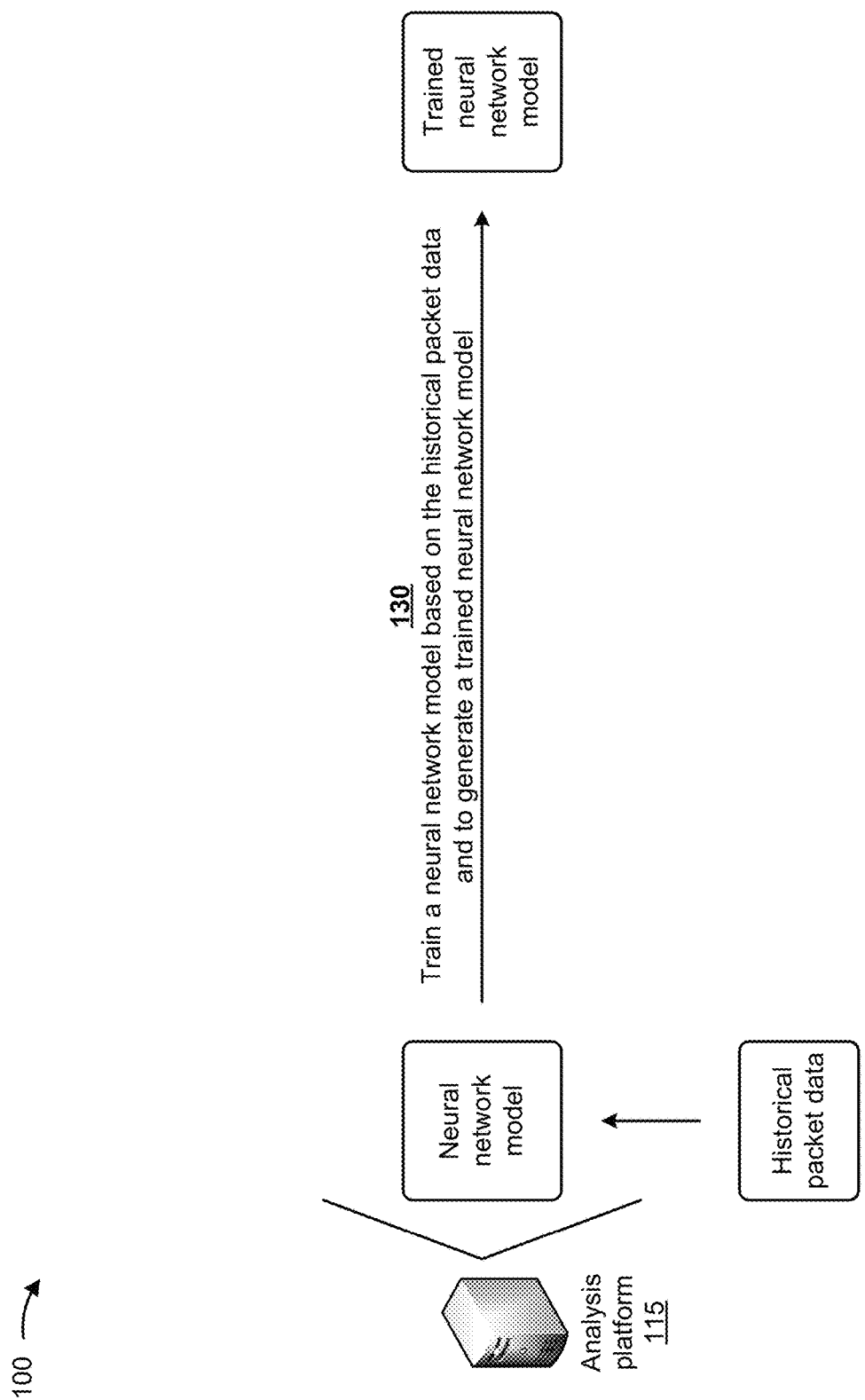

As shown in FIG. 1B, and by reference number 130, the analysis platform 115 may use the historical packet data to train a machine learning model. This training may result in a trained machine learning model. The trained machine learning model may be used to determine whether a packet and/or a traffic flow is associated with a problem, an error, and/or the like. The machine learning may include, for example, a neural network model, such as a feedforward neural network model, a radial basis function neural network model, a multilayer perceptron model, a convolutional neural network model, a recurrent neural network model, a modular neural network model, and/or the like. Additionally, or alternatively, the machine learning model may include another type of model other than a neural network model. Details of training the machine learning model are described below in connection with FIG. 2.

As shown in FIG. 1C, and by reference number 135, the analysis platform 115 may receive packet data identifying particular packets exchanged between particular client devices 110 via a network of particular network devices 105. For example, client devices 110 may exchange packets (e.g., in traffic flows), as described above in connection with FIG. 1A. The analysis platform 115 may input this packet data (e.g., new packet data, current packet data, and/or the like) into a machine learning model trained using historical packet data as feedback to determine whether a packet and/or a traffic flow is associated with a problem, an error, and/or the like, as described in more detail below. In some implementations, the analysis platform 115 may process the packet data (sometimes referred to as pre-processing) to generate input data for the machine learning model. Alternatively, the analysis platform 115 may input the packet data directly to the machine learning model without pre-processing, such as if the analysis platform 115 receives the packet data in a format that is ready for processing. For example, the analysis platform 115 may receive (e.g., as packet data) only values of relevant fields, and may receive an indication of an association between values and corresponding fields. Alternatively, the analysis platform may process the packet data to generate information that identifies the relevant fields and an indication of an association between values and corresponding fields.

In some implementations, the analysis platform 115 may be used to analyze packets transmitted by one or more particular client devices 110, received by one or more particular client devices 110, transferred via one or more particular network devices 105, transmitted via one or more particular networks, and/or the like. In this case, the analysis platform 115 may transmit, to the particular network devices 105 and/or the particular client devices 110, an instruction to transmit packet data to the analysis platform 115. In some implementations, the instruction may include one or more conditions and/or filtering criteria for transmitting packet data to the analysis platform 115. If a packet or a traffic flow satisfies the one or more conditions and/of if the filtering criteria is satisfied for the packet and/or the traffic flow, the network device 105 and/or the client device 110 may transmit the packet (and/or packets of the traffic flow) to the analysis platform 115.

Figure 1D:
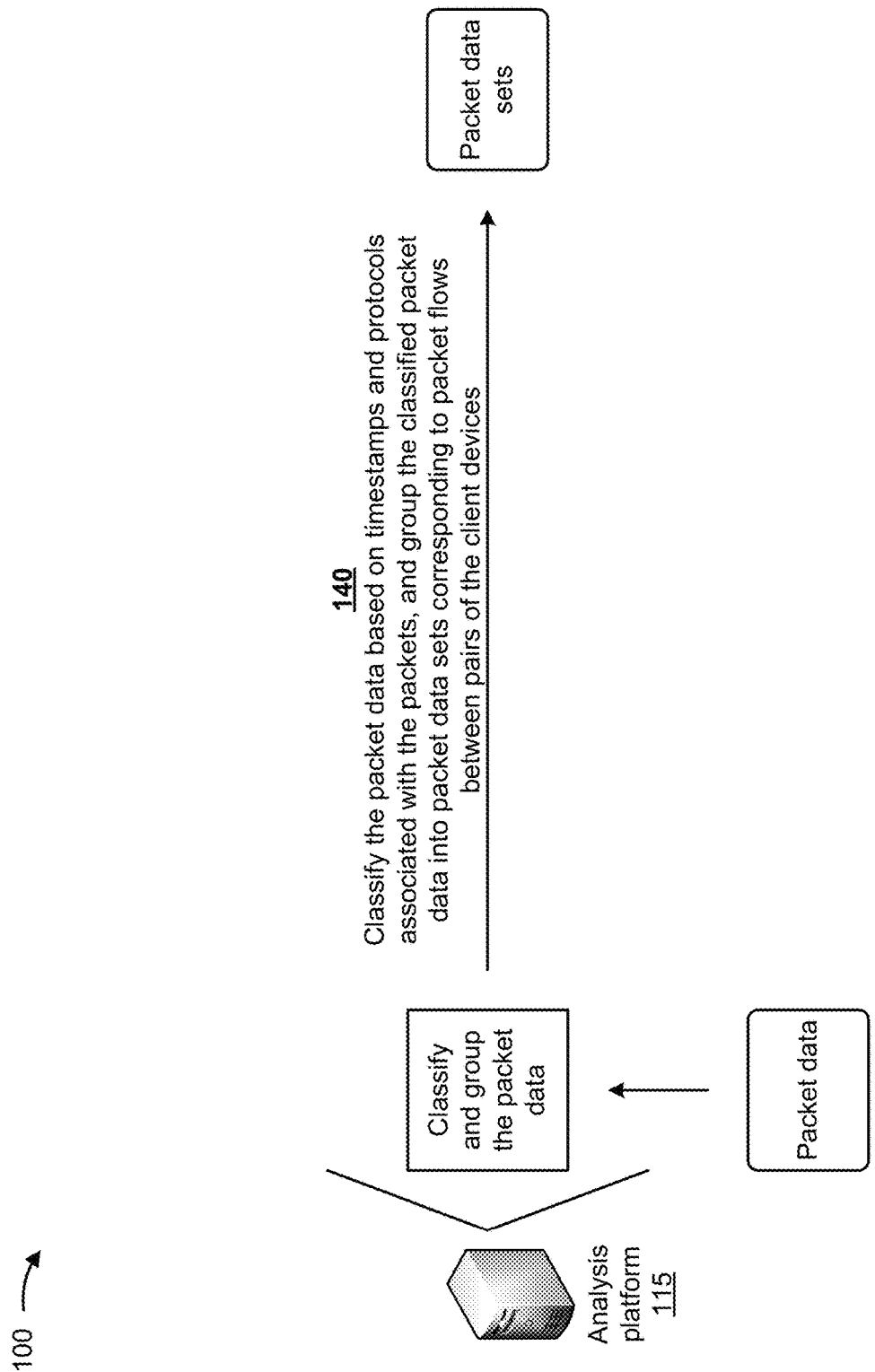

As shown in FIG. 1D, and by reference number 140, the analysis platform 115 may (e.g., when pre-processing packet data) classify the packet data based on timestamps and/or protocols associated with the particular packets exchanged between particular client devices 110 via a network of particular network devices 105. This classification may result in classified packet data. As further shown, the analysis platform 115 may group the classified packet data into packet data sets corresponding to packet flows between pairs of the particular client devices 110. For example, the analysis platform 115 may group packet data into multiple data sets (e.g., packet data sets), where each packet data set is associated with a particular traffic flow. In some implementations, the analysis platform 115 may sequence packets in a packet data set. The analysis platform 115 may use a variety of parameter values (e.g., field values) of packet headers to performing this grouping, such as a timestamp field (or parameter), a protocol field, a source Internet Protocol (IP) address field, a destination IP address field, a source port identifier field (or source port number field), a destination port identifier field (or destination port number field), and/or the like. In some implementations, the analysis platform 115 may classify the packet data based on timestamps, embedded protocols, and embedded protocol header values associated with the packets.

For example, the analysis platform 115 may group packet data with timestamps that satisfy a condition, such as being within a threshold amount of time of one another. A timestamp may include, for example, a reception timestamp that indicates a time at which a packet with the timestamp was received (e.g., by a network device 105, by a client device 110, and/or the like), a transmission timestamp that indicates a time at which a packet with the timestamp was transmitted (e.g., by a network device 105, by a client device 110, and/or the like), a processing timestamp that indicates a time at which a packet with the timestamp was processed (e.g., by a network device 105, by a client device 110, and/or the like), and/or the like. In some implementations, the analysis platform may analyze multiple timestamps (e.g., two or more of a reception timestamp, a transmission timestamp, or a processing timestamp) to group packet data into traffic flows.

Additionally, or alternatively, the analysis platform 115 may group packet data using a value of a protocol field. For example, the analysis platform 115 may classify packet data having different protocol field values into different groups. In some implementations, the analysis platform 115 may classify packet data associated with a particular protocol filed value into multiple groups depending on a timestamp or another packet parameter. Example protocols include an AppleTalk transaction protocol, a user datagram protocol (UDP), a UDP Lite protocol, a cyclic UDP, a reliable UDP, a transaction control protocol (TCP), a multipath TCP, a sequenced packet exchange protocol, a voice over Internet protocol (VoIP), a session initiation protocol, or a real-time transport (RTP) protocol, among other exampled.

Additionally, or alternatively, the analysis platform 115 may group packet data into flows using 5-tuple information or a portion of 5-tuple information for a packet. The 5-tuple information may include, for example, a source IP address for a packet, a destination IP address for a packet, a source port identifier for a packet, a destination port identifier for a packet, and a protocol for a packet. This 5-tuple information may be carried in a header of the packet (e.g., a packet header). In some implementations, the analysis platform may group packet data that has the same 5-tuple information (e.g., where all 5 field values match across packets) into the same packet data set. Similarly, the analysis platform may group packet data that has different 5-tuple information (e.g., at least one of the 5 fields does not match across packets) into the same packet data set. Additionally, or alternatively, the analysis platform 115 may group packet data that has the same 5-tuple information and timestamps that satisfy a condition (e.g., are within a threshold amount of time of one another) into the same packet data set. Similarly, the analysis platform 115 may group packet data that has the same same 5-tuple information and timestamps that do not satisfy a condition (e.g., are not within a threshold amount of time of one another) into different packet data sets.

Figure 1E:
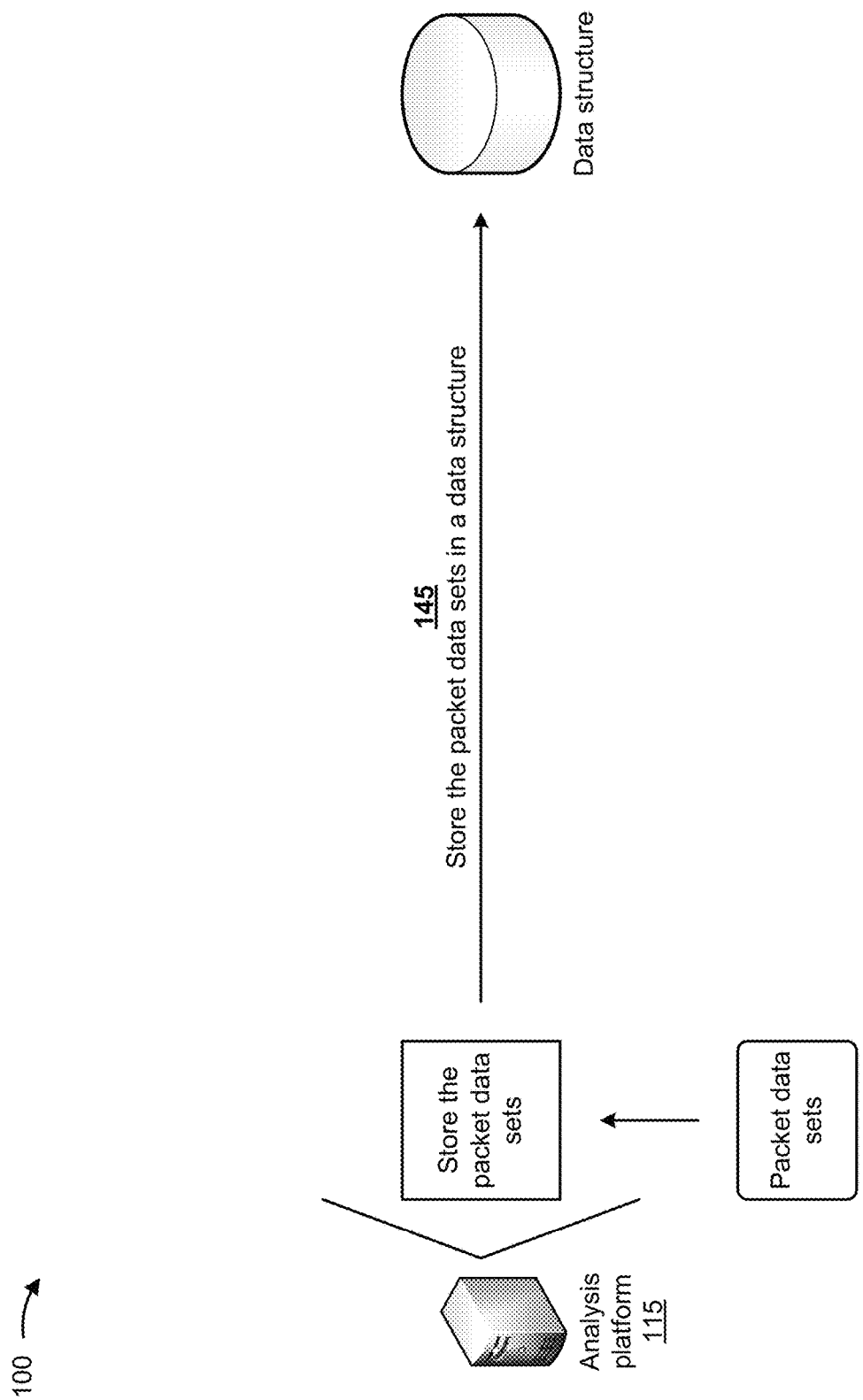

As shown in FIG. 1E, and by reference number 145, the analysis platform 115 may store the packet data sets in a data structure. The data structure may be stored in memory internal to analysis platform 115 or external from analysis platform 115. The data structure may include, for example, an indication of packets that are associated with one another, packet data of those packets, classified packet data of those packets, a traffic flow to which those packets belong, one or more network device identifiers (e.g., IP addresses, medium access control (MAC) addresses, and/or the like) for one or more network devices 105 that processed those packets, one or more client device identifiers (e.g., IP addresses, MAC addresses, and/or the like) for one or more client devices 110 that transmitted or received those packets, and/or the like. In some implementations, the analysis platform 115 may convert the packet data set into a particular type of file format, such as a packet capture data file format.

Figure 1F:
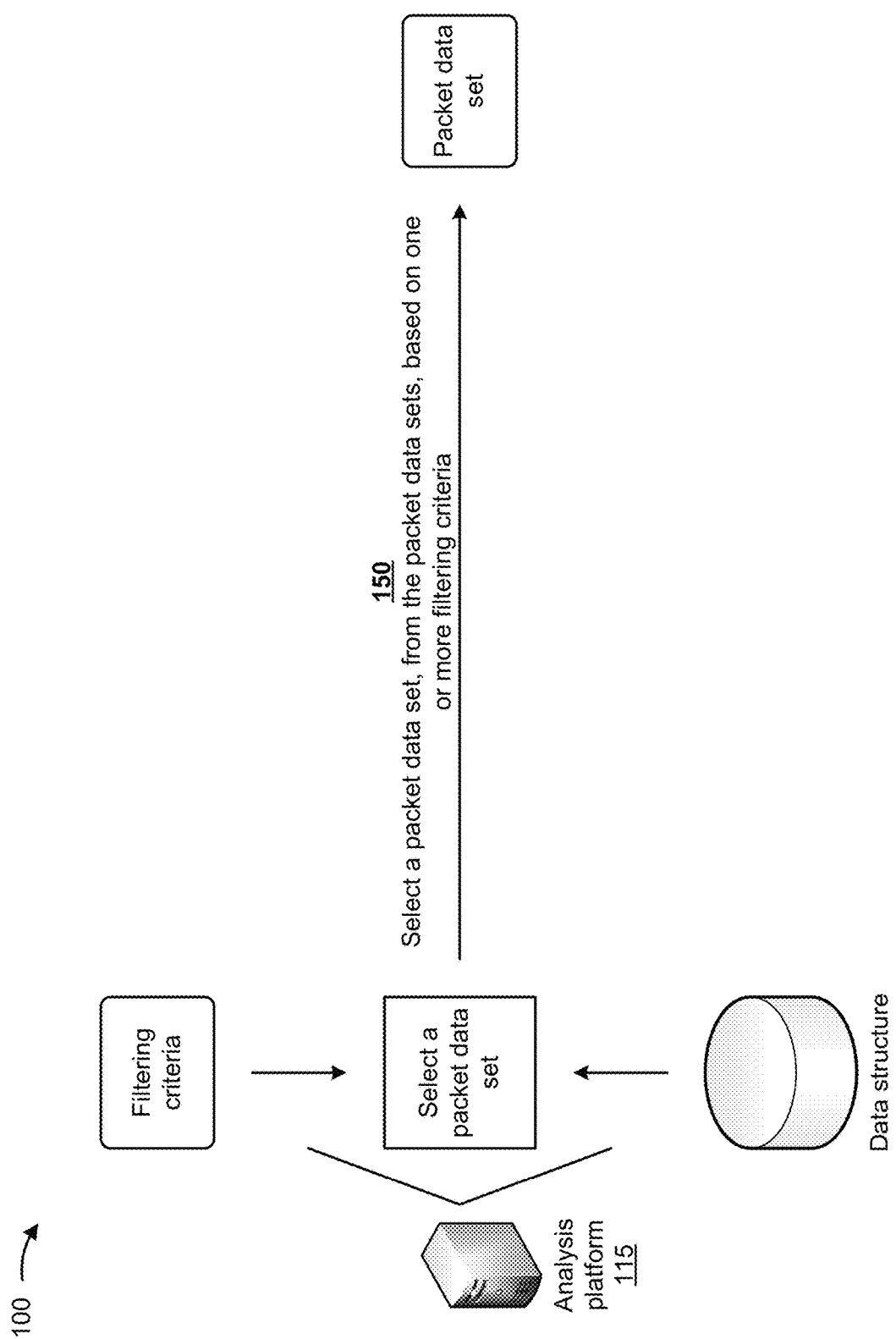

As shown in FIG. 1F, and by reference number 150, the analysis platform 115 may select a packet data set, from the packet data sets, based on one or more filtering criteria. For example, the filtering criteria may include a particular traffic flow or a group of traffic flows, a network device identifier of a network device 105, a client device identifier of a client device 110, and/or the like. In some implementations, the analysis platform 115 may receive the filtering criteria based on input provided to the analysis platform 115 or another device in communication with the analysis platform 115 (e.g., based on user input that indicates the filtering criteria). Additionally, or alternatively, the analysis platform 115 may receive the filtering criteria based on detection of and/or receiving a report of an error associated with a traffic flow, an error associated with a network device 105, an error associated with a client device 110, an error associated with a particular packet, and/or the like.

The analysis platform 115 may identify a packet data set (or multiple packet data sets) based on the filtering criteria. For example, the analysis platform may identify a packet data set for a particular traffic flow, one or more packet data sets for packets that traversed a particular network device 105 (or a set of network devices 105, or a threshold number of network devices 105 in a set of network devices 105, and/or the like), one or more packet data sets for packets that were transmitted by or received by a particular client device 110 (or a set of client devices 110, or a threshold number of client device 110 in a set of client devices 110, and/or the like), and/or the like. In some implementations, the analysis platform 115 may select (e.g., obtain, retrieve, extract, look up, and/or the like) the packet data set from the data structure described above. In this way, the analysis platform 115 can analyze particular packet data sets of interest.

Figure 1G:
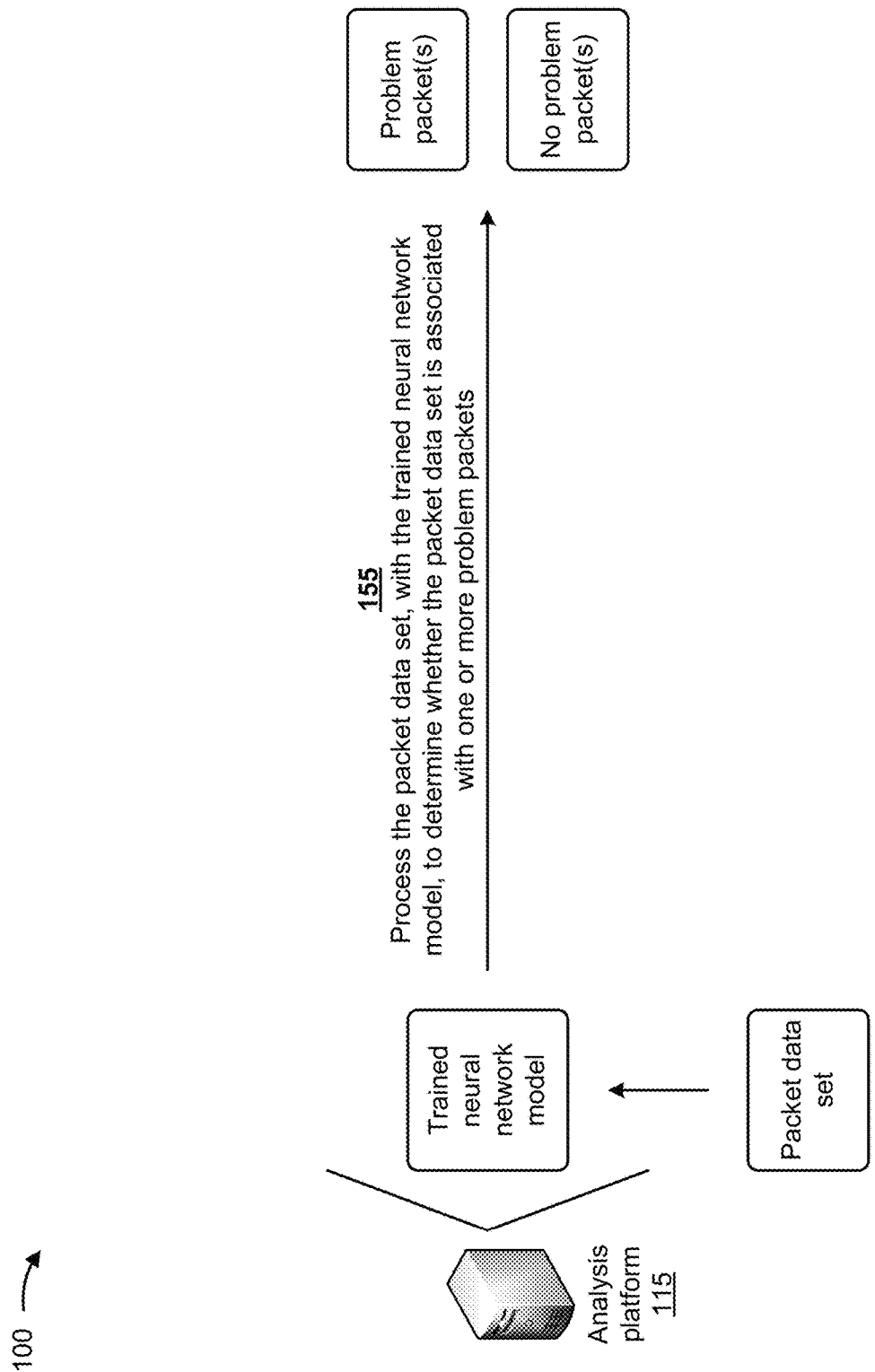

As shown in FIG. 1G, and by reference number 155, the analysis platform may process the packet data set with the trained machine learning model (e.g., a trained neural network model) to determine whether the packet data set is associated with one or more problem packets. A problem packet may refer to, for example, a packet associated with an error, a packet having an incorrect format, a packet having an incorrect field (e.g., in a packet header), a packet having an incorrect value in a field (e.g., in a packet header), a packet having an incorrect packet header (e.g., due to an incorrect field and/or an incorrect value of a field), a packet having an incorrect protocol (e.g., a packet payload protocol), and/or the like. The analysis platform 115 may provide input with a particular format to the machine learning model to generate consistent results. For example, the analysis platform 115 may provide values for a particular set of fields in a particular order (e.g., based on pre-processing a packet data set, as described above), may provide the packet data set (or a portion of the packet data set) in a particular file format, such as a packet capture data file format, and/or the like. As a result of processing the packet data set, the packet data set may be classified as being associated with a problem packet or not being associated with a problem packet. Details of processing the packet data set using machine learning model are described below in connection with FIG. 3. In some implementations, the analysis platform 115 may account for copies of packets generated and/or transmitted in connection with performing the analysis when determining whether a packet data set is associated with a problem packet.

As shown in FIG. 1H, and by reference number 160, the analysis platform 115 may perform one or more actions (e.g., one or more corrective actions) based on determining whether the packet data set is associated with one or more problem packets (e.g., a single problem packet, multiple problem packets, or a threshold quantity of problem packets, among other examples). In some implementations, the analysis platform 115 may perform one or more corrective actions (e.g., modifications) to a network associated with a packet data set that includes one or more problem packets. In some implementations, the analysis platform may identify a network associated with the packet data set or a problem packet, one or more network devices 105 associated with the packet data set or a problem packet, or one or more client devices 110 associated with the packet data set or a problem packet, among other examples. For example, if the packet data set is associated with a problem packet (or a threshold quantity of problem packets), then the analysis platform 115 may determine a network associated with the packet data set, one or more network devices 105 associated with the packet data set, one or more client devices 110 associated with the packet data set, and/or the like.

In some implementations, the analysis platform 115 may output information that identifies the packet data set, information that identifies the traffic flow associated with the packet data set, information that identifies the one or more problem packets, information that identifies one or more network devices associated with the packet data set or the one or more problem packets, information that identifies one or more client devices associated with the packet data set or the one or more problem packets, and/or the like. The output may be provided for display by the analysis platform 115 or a device in communication with the analysis platform 115 (in which case the analysis platform 115 provides the output to the device). This may enable a user (e.g., a network administrator, a technician) to correct the problem, such as by remotely accessing a device, dispatching a technician to service the device, and/or the like. In some implementations, the analysis platform 115 may determine that there is not a problem (e.g., there are no issues) associated with a packet data set. In this case, the analysis platform may provide output (e.g., for display, as described above) indicating that there are no issues associated with the packet data set, a network associated with the packet data set, a network device associated with the packet data set, a client device associated with the packet data set, and/or the like.

In some implementations, the analysis platform 115 may diagnose a problem by identifying one or more causes or one or more problems associated with one or more problem packets. For example, an output of the machine learning model may indicate or predict a problem associated with a problem packet. The analysis platform 115 may provide output that indicates the problem, may recommend an action (e.g., a corrective action) to resolve the problem (e.g., via output), and/or may automatically perform an action to resolve the problem.

In some implementations, the analysis platform 115 may, based on predicting a problem associated with the problem packet, perform an action to resolve the problem. The action may include, for example, modifying a network associated with the problem packet, modifying a network device associated with the problem packet, modifying a client device associated with the problem packet, and/or the like. To perform the modification, the analysis platform 115 may transmit an instruction to change a configuration of the network device 105 and/or the client device 110. The instruction may include, for example, an instruction to use a particular protocol for a packet when one or more conditions are satisfied for the packet or a traffic flow of the packet, an instruction to use a particular value of a field (e.g., a 5-tuple field or another field) for a packet when one or more conditions are satisfied for the packet or a traffic flow of the packet, or an instruction to download and/or install a software application (e.g., a new version of a software application, a software patch, a bug fix, and/or the like), among other examples.

In some implementations, the analysis platform 115 may determine that a software application is a cause of the problem for a device (e.g., a network device 105 and/or a client device 110) associated with the packet data set. For example, if the analysis platform 115 receives packet data that indicates that client devices 110 and/or network devices 105 executing a particular software application are associated with traffic flows that include a problem packet, then the analysis platform 115 may determine that the particular software application is a cause of the problem. The analysis platform 115 may identify the software application and/or the device, and may identify a vendor associated with the software application and/or the device, and may provide, to a device associated with the vendor, a notification that includes information about the device (e.g., a device (identifier, a device location, and/or the like), the software application (e.g., a name of the software application, a version of the software application, and/or the like), the traffic flow, the problem packet (e.g., stored information about the problem packet from the packet data set), a problem associated with the problem packet, a recommended resolution to the problem, and/or the like.

In some implementations, the analysis platform 115 may cause an autonomous vehicle or an autonomous machine (e.g., a robot) to be dispatched to service a network device and/or a client device associated with a problem packet. For example, the analysis platform may store location information that indicates a geographic location of the network device and/or the client device, a location within a building (e.g., a data center, a server farm, and/or the like) of the network device and/or the client device, and/or the like. Based on identifying a network device or a client device as being associated with a problem packet, the analysis platform 115 may provide the location and/or navigation directions to the autonomous vehicle or machine, and the autonomous vehicle or machine may navigate to the network device or the client device. The autonomous vehicle or machine may be capable of servicing or replacing the network device or the client device. In some cases, the autonomous vehicle or machine may only be capable of resolving particular problems (e.g., problems that require replacement of the network device or the client device, hardware problems, and/or the like). Thus, the analysis platform 115 may cause the autonomous vehicle or machine to be dispatched based on identifying one of these particular problems.

In some implementations, the analysis platform 115 may retrain the machine learning model based on determining whether the packet data set is associated with one or more problem packets and/or based on identifying one or more problems. For example, the packet data set may be input as a new observation with an appropriate target variable determined by the analysis platform 115, as described in more detail below in connection with FIG. 2 and FIG. 3.

In this way, implementations described herein may enable a large volume of packets (e.g., thousands, millions, billions, or more) to be analyzed quickly and efficiently. This analysis can be used to improve network performance, reduce latency, increase reliability, reduce a quantity of dropped sessions and/or dropped calls, and/or the like. In some implementations, the analysis may be performed in real time to improve performance associated with a traffic flow as the traffic flow is occurring, which may significantly improve performance and reduce errors.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
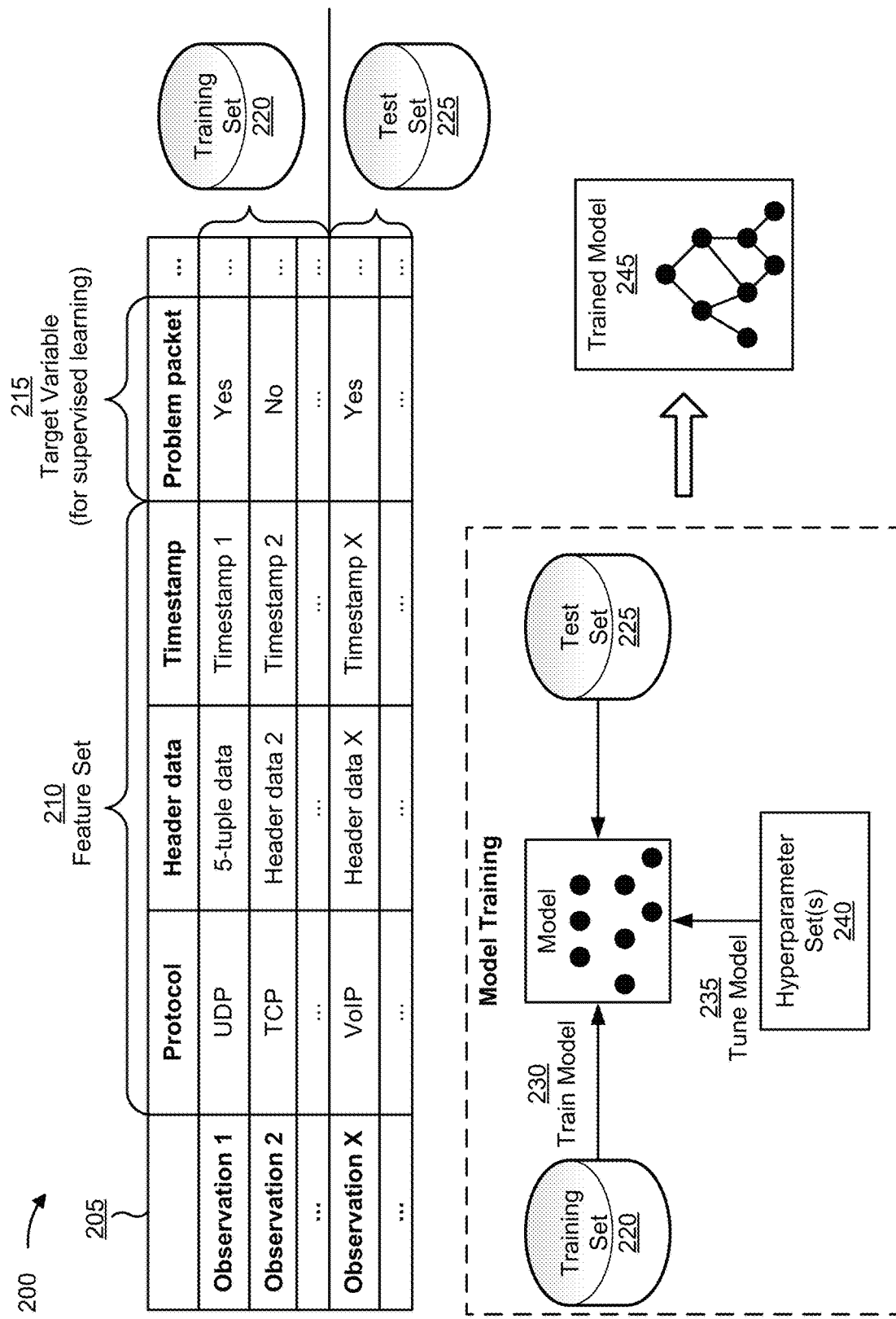
FIG. 2 is a diagram illustrating an example of training a machine learning model in connection with performing packet capture data analysis.

FIG. 2 is a diagram illustrating an example 200 of training a machine learning model in connection with performing packet capture data analysis. The machine learning model training described herein may be performed using a machine learning system. The machine learning system may include or may be included in a computing device, a server, a cloud computing environment, and/or the like, such as analysis platform 115 described in more detail below.

As shown by reference number 205, a machine learning model may be trained using a set of observations. The set of observations may be obtained and/or input from historical data, such as data gathered during one or more processes described herein. For example, the set of observations may include data gathered from one or more network devices 105, one or more client devices 110, and/or an administrator device 120, as described elsewhere herein. In some implementations, the machine learning system may receive the set of observations (e.g., as input) from one or more network devices 105, one or more client devices 110, and/or an administrator device 120.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from network device 105, client device 110, and/or administrator device 120. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from network device 105, client device 110, and/or administrator device 120, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of protocol, a second feature of header data (e.g., which may be separated into multiple features for different fields of the header, for example), a third feature of timestamp, and so on. As shown, for a first observation, the first feature may have a value of UDP, the second feature may have one or more values for 5-tuple fields of the header, the third feature may have a value that indicates a timestamp associated with the observation, and so on. These features and feature values are provided as examples, and may differ in other examples. For example, the feature set may include a protocol associated with a packet or a packet data set (e.g., a traffic flow), a source IP address associated with a packet or a packet data set (e.g., a traffic flow), a destination IP address associated with a packet or a packet data set (e.g., a traffic flow), a source port identifier associated with a packet or a packet data set (e.g., a traffic flow), a destination port identifier associated with a packet or a packet data set (e.g., a traffic flow), a timestamp associated with a packet or a packet data set (e.g., a traffic flow), and/or other header data associated with a packet or a packet data set (e.g., a traffic flow). Additionally, or alternatively, the feature set may include payload data (e.g., which may be encrypted so as to prevent exposure of private user data) associated with a packet or a packet data set (e.g., a traffic flow), a network associated with a packet or a packet data set (e.g., a traffic flow), a network device associated with a packet or a packet data set (e.g., a traffic flow), a set of network devices associated with a packet or a packet data set (e.g., a traffic flow), a client device associated with a packet or a packet data set (e.g., a traffic flow), a set of client devices associated with a packet or a packet data set (e.g., a traffic flow), and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is a problem packet, which has a value of "Yes" for the first observation, indicating that the first observation (e.g., representing a packet data set) is associated with a problem packet. Although the target variable value is shown as binary value of yes or no (e.g., 1 or 0), the target variable value may be a score (e.g., from 0 to 10 or from 0 to 100, among other examples) that indicates a likelihood that the observation (e.g., packet data set) is associated with a problem packet. In this case, rather than generating a recommendation or performing an action based on a binary value, the analysis platform 115 may generate a recommendation or perform an action based on whether the score satisfies a threshold.

The feature set and target variable described above are provided as examples, and other examples may differ from what is described above. For example, for a target variable of problem type, the feature set may include the same or similar features as described above, and the target variable may include a discrete indication of a type of problem associated with the observation. The indication of the type of problem may be categorized and/or provided to the machine learning model by the administrator device 120. For example, a user may categorize historical issues that have been resolved, and that information may be provided as a target variable along with a feature set that is part of an observation that is input to the machine learning model. Examples of types of problems include a software problem, a particular type of software problem (e.g., an outdate software version or a particular bug, among other examples), a problem associated with a particular software program, a hardware problem, a particular type of hardware problem, a hardware problem associated with a particular hardware component, a firmware problem, a particular type of firmware problem, an error associated with a network device, a particular type of error associated with a network device, an error associated with a client device, a particular type of error associated with a client device, a protocol problem, a problem associated with a particular protocol, and/or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a feedforward neural network algorithm, a radial basis function neural network algorithm, a multilayer perceptron algorithm, a convolutional neural network algorithm, a recurrent neural network algorithm, a modular neural network algorithm, and/or the like), a deep learning algorithm, and/or the like.

Figure 3:
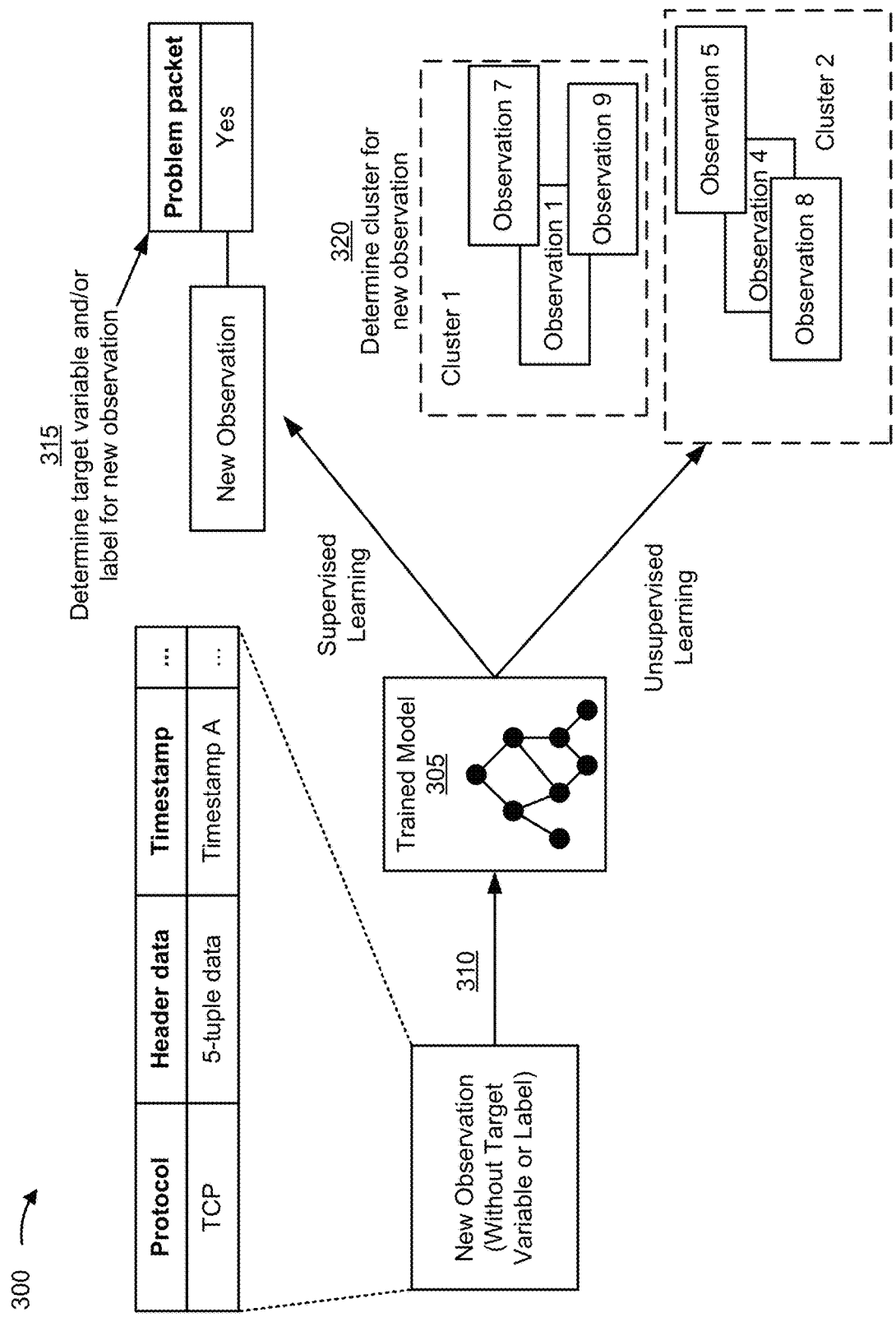
FIG. 3 is a diagram illustrating an example of applying a trained machine learning model to a new observation in connection with performing packet capture data analysis.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as analysis platform 115.

As shown by reference number 310, the machine learning system may receive a new observation (or a set of new observations), and may input the new observation to the machine learning model 305. As shown, the new observation may include a first feature of TCP, a second feature that includes one or more values for 5-tuple fields for a header, a third feature that indicates a timestamp associated with the new observation, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of "Yes" for the target variable of problem packet for the new observation, as shown by reference number 315. Based on this prediction (e.g., based on the value having a particular label or classification, based on the value satisfying or failing to satisfy a threshold, and/or the like), the machine learning system may provide a recommendation and/or output for determination of a recommendation, such as identifying a network associated with the packet data set or a problem packet, identifying one or more network devices 105 associated with the packet data set or a problem packet, identifying one or more client devices 110 associated with the packet data set or a problem packet, identifying a software application associated with a problem packet, identifying a vendor associated with the software application, outputting information that identifies the packet data set, outputting information that identifies the traffic flow associated with the packet data set, outputting information that identifies the one or more problem packets, outputting information that identifies one or more network devices associated with the packet data set or the one or more problem packets, outputting information that identifies one or more client devices associated with the packet data set or the one or more problem packets, identifying a problem associated with one or more problem packets, outputting information that identifies the problem, outputting information that identifies a software application associated with a problem packet, outputting information that identifies a vendor associated with the software application, notifying the vendor, outputting a recommendation to resolve the problem, and/or the like. Additionally, or alternatively, the machine learning system may perform an automated action (e.g., a corrective action) and/or may cause an automated action to be performed (e.g., by instructing another device to perform the automated action), such as modifying a network associated with the problem packet, modifying a network device associated with the problem packet, modifying a client device associated with the problem packet, transmitting an instruction to change a configuration of the network device and/or the client device, causing an autonomous vehicle or an autonomous machine (e.g., a robot) to be dispatched to service the a network device and/or a client device associated with a problem packet, and/or the like As another example, if the machine learning system were to predict a value of "No" for the target variable of problem packet, then the machine learning system may provide a different recommendation (e.g., an indication that no action is necessary). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., for a first type of problem), then the machine learning system may provide a first recommendation, such as one or more recommendations described elsewhere herein. Additionally, or alternatively, the machine learning system may perform a first automated action and/or may cause a first automated action to be performed (e.g., by instructing another device to perform the automated action) based on classifying the new observation in the first cluster, such as one or more actions described elsewhere herein. As another example, if the machine learning system were to classify the new observation in a second cluster (e.g., for a second type of problem), then the machine learning system may provide a second (e.g., different) recommendation (e.g., a different one or more recommendations described elsewhere herein) and/or may perform or cause performance of a second (e.g., different) automated action, such as a different one or more actions described elsewhere herein.

In this way, the machine learning system may apply a rigorous and automated process to perform packet capture data analysis. The machine learning system enables recognition and/or identification of tens, hundreds, thousands, or millions of features and/or feature values for tens, hundreds, thousands, or millions of observations, thereby increasing accuracy and consistency and reducing delay associated with performing packet capture data analysis relative to requiring computing resources to be allocated for tens, hundreds, or thousands of operators to manually perform packet capture data analysis using the features or feature values.

As indicated above, FIG. 3 is provided as an example. Other examples may differ from what is described in connection with FIG. 3.

Figure 4:
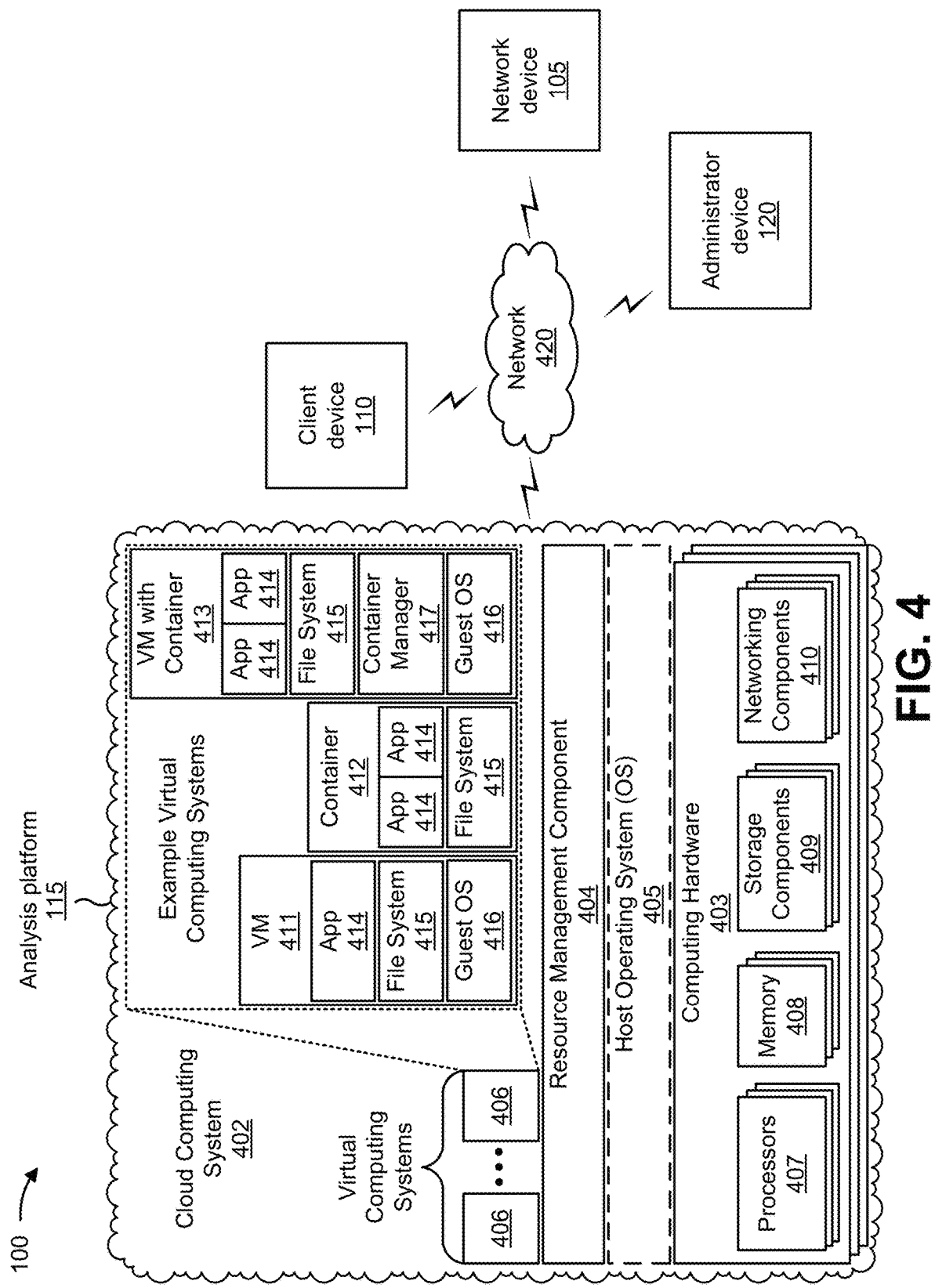
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a analysis platform 115. The analysis platform 115 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, a network device 105, a client device 110, and/or an administrator device 120. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the analysis platform 115 to perform one or more operations or processes described herein. A storage component 409 includes a hard disk or another type of storage device that stores information, data, and/or software (e.g., code, instructions, and/or the like) related to the operation and use of the analysis platform 115. In some implementations, memory 408 and/or storage component 409 is/are implemented as a non-transitory computer readable medium. A networking component 410 includes a network interface and corresponding hardware that enables the analysis platform 115 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application (s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the analysis platform 115 may include one or more elements 403-417 of the cloud computing system 402, may execute within the cloud computing system 402, and/or may be hosted within the cloud computing system 402, in some implementations, the analysis platform 115 may not be cloud-based (e.g., may be implemented outside of a cloud computing system) or may be partially cloud-based. For example, the analysis platform 115 may include one or more devices that are not part of the cloud computing system 402, such as device 500 of FIG. 5, which may include a standalone server or another type of computing device. The analysis platform 115 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The network device 105 includes one or more devices capable of receiving, processing, storing, routing, and/or providing traffic (e.g., a packet, other information or metadata, and/or the like) in a manner described herein. For example, the network device 105 may include a router, such as a label switching router (LSR), a label edge router (LER), an ingress router, an egress router, a provider router (e.g., a provider edge router, a provider core router, and/or the like), a virtual router, and/or the like. Additionally, or alternatively, the network device 105 may include a gateway, a switch, a firewall, a hub, a bridge, a reverse proxy, a server (e.g., a proxy server, a cloud server, a data center server, and/or the like), a load balancer, and/or a similar device. In some implementations, the network device 105 may be a physical device implemented within a housing, such as a chassis. In some implementations, the network device 105 may be a virtual device implemented by one or more computing devices of a cloud computing environment or a data center. In some implementations, a group of network devices 105 may be a group of data center nodes that are used to route traffic flow through a network. In some implementations, the network device 105 includes or executes a network tap to capture packets.

The client device 110 includes one or more devices capable of receiving, generating, storing, processing, and/or providing information associated with packet capture data analysis, as described elsewhere herein. The client device 110 may include a communication device and/or a computing device. For example, the client device 110 may include an endpoint device, a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 110 may communicate with one or more other devices of environment 400, as described elsewhere herein.

The administrator device 120 includes one or more devices capable of receiving, generating, storing, processing, and/or providing information associated with packet capture data analysis, as described elsewhere herein. The administrator device 120 may include a communication device and/or a computing device. For example, the administrator device 120 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The administrator device 120 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
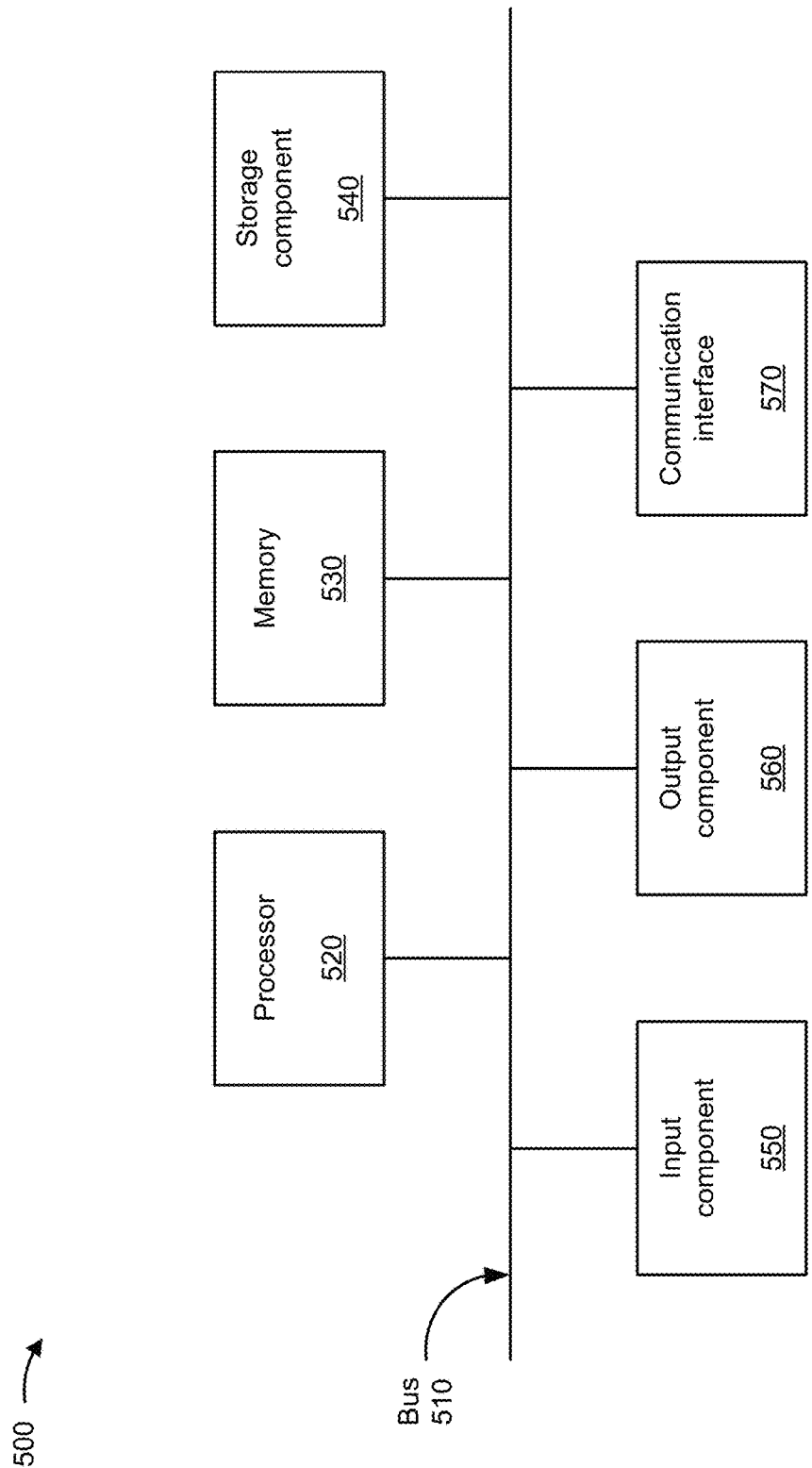
FIG. 5 is a diagram of example components of one or more devices of FIG. 2.

FIG. 5 is a diagram of example components of a device 500. Device 500 may correspond to network device 105, client device 110, analysis platform 115, and/or administrator device 120. In some implementations, network device 105, client device 110, analysis platform 115, and/or administrator device 120 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
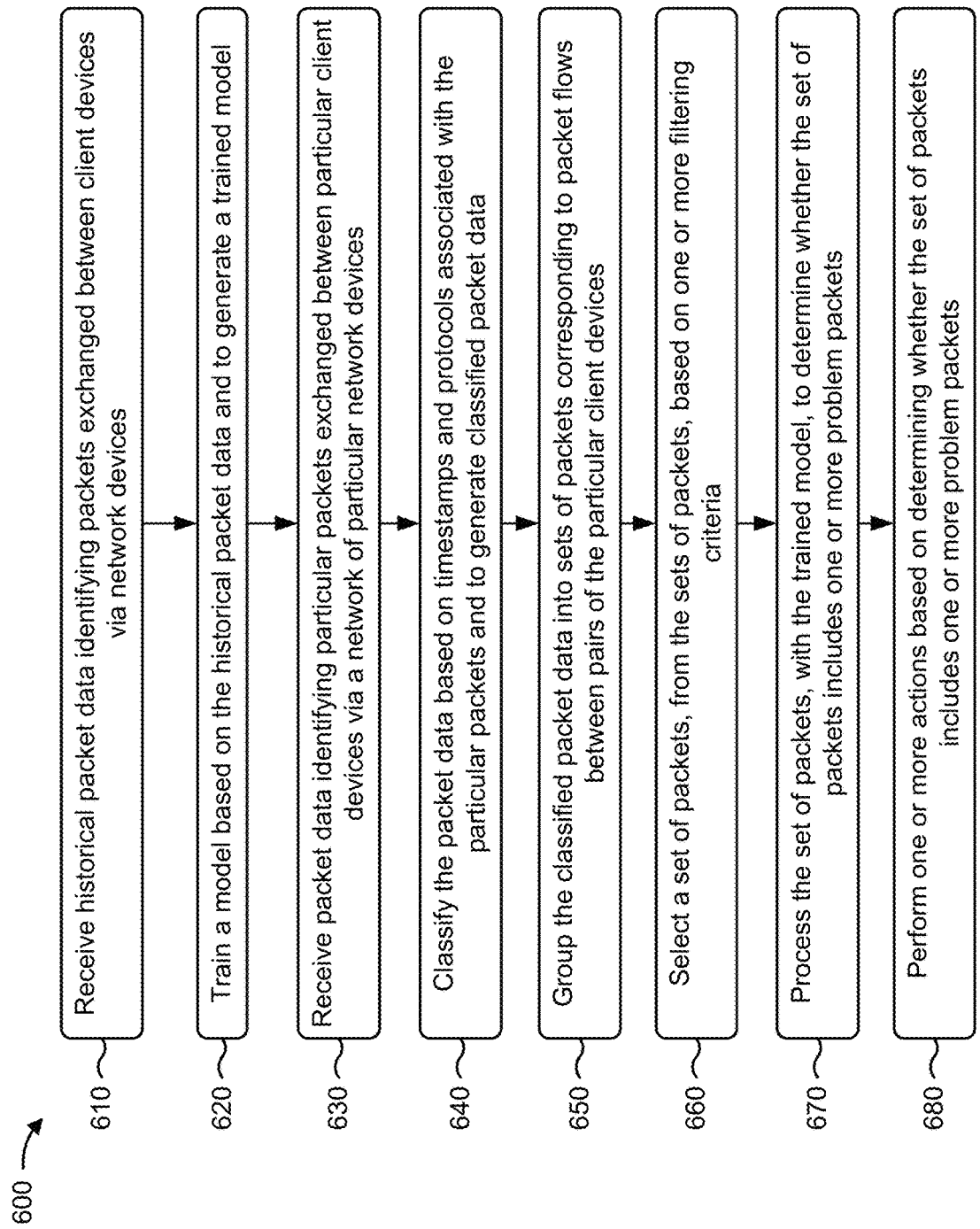
FIG. 6 is a flow chart of an example process relating to training and utilizing a neural network model to perform packet capture data analysis.

FIG. 6 is a flow chart of an example process 600 associated with utilizing a neural network model to perform packet capture data analysis. In some implementations, one or more process blocks of FIG. 6 may be performed by a device (e.g., device 500, analysis platform 115, and/or the like). In some implementations, one or more process blocks of FIG. 6 may be performed by another device or a group of devices separate from or including the device, such as a network device (e.g., network device 105), a client device (e.g., client device 110), an administrator device (e.g., administrator device 120), and/or the like. Additionally, or alternatively, one or more process blocks of FIG. 6 may be performed by one or more components of a device 500, such as processor 520, memory 530, storage component 540, input component 550, output component 560, communication interface 570, and/or the like.

As shown in FIG. 6, process 600 may include receiving historical packet data identifying packets exchanged between client devices via network devices (block 610). For example, the device may receive historical packet data identifying packets exchanged between client devices via network devices, as described above.

As further shown in FIG. 6, process 600 may include training a model based on the historical packet data and to generate a trained model (block 620). For example, the device may train a model based on the historical packet data and to generate a trained model, as described above. The model may include, for example, a neural network model, a decision tree model, a random forest model, a supervised learning model, an unsupervised learning model, a reinforcement learning model, a linear regression model, a logistic regression model, a support vector machine model, a naïve Bayesian model, a k-means model, a k-nearest neighbors model, and/or another type of machine learning model. In some implementations, the device may not train or use a model to identify problem packets.

As further shown in FIG. 6, process 600 may include receiving packet data identifying particular packets exchanged between particular client devices via a network of particular network devices (block 630). For example, the device may receive packet data identifying particular packets exchanged between particular client devices via a network of particular network devices, as described above.

As further shown in FIG. 6, process 600 may include classifying the packet data based on timestamps and protocols associated with the particular packets and to generate classified packet data (block 640). For example, the device may classify the packet data based on timestamps and protocols associated with the particular packets and to generate classified packet data, as described above.

As further shown in FIG. 6, process 600 may include grouping the classified packet data into packet data sets corresponding to packet flows between pairs of the particular client devices (block 650). For example, the device may group the classified packet data into packet data sets corresponding to packet flows between pairs of the particular client devices, as described above.

As further shown in FIG. 6, process 600 may include selecting a packet data set, from the packet data sets, based on one or more filtering criteria (block 660). For example, the device may select a packet data set, from the packet data sets, based on one or more filtering criteria, as described above. In some implementations, process 600 includes storing the packet data sets in a data structure. In this case, selecting the packet data set from the packet data sets may include selecting the packet data set from the packet data sets stored in the data structure.

As further shown in FIG. 6, process 600 may include processing the packet data set, with the trained model, to determine whether the packet data set is associated with one or more problem packets (block 670). For example, the device may process the packet data set with the trained model, and may determine whether the packet data set is associated with one or more problem packets, as described above. In some implementations, process 600 includes converting the packet data set into a data file that includes data provided in the packet data set. In this case, processing the packet data set may include processing the data file, for example with the model, to determine whether the packet data set is associated with the one or more problem packets. The data file may have a packet capture data file format. In some implementations, the device may not train or use a model to determine whether the packet data set is associated with one or more problem packets. For example, the device may use protocols, timestamps, and/or packet header values to determine whether the packet data set is associated with one or more problem packets (e.g., without utilizing a machine learning model for the determination).

As further shown in FIG. 6, process 600 may include performing one or more actions based on determining whether the packet data set is associated with one or more problem packets (block 680). For example, the device may perform one or more actions based on determining whether the packet data set is associated with one or more problem packets, as described above. In some implementations, performing the one or more actions may include identifying, when the packet data set is associated with the one or more problem packets, the network, one of the particular network devices, or one of the particular client devices based on the one or more problem packets. Additionally, or alternatively, performing the one or more actions may include providing, when the packet data set is associated with the one or more problem packets, data identifying the one or more problem packets for display. Additionally, or alternatively, performing the one or more actions may include identifying, when the packet data set is associated with the one or more problem packets, one or more causes of problems associated with the one or more problem packets.

Additionally, or alternatively, performing the one or more actions may include determining, when the packet data set is associated with the one or more problem packets, a modification to the network, one of the particular network devices, or one of the particular client devices based on the one or more problem packets. Additionally, or alternatively, performing the one or more actions may include causing, when the packet data set is associated with the one or more problem packets, an autonomous vehicle to be dispatched to service the network or one of the particular network devices. Additionally, or alternatively, performing the one or more actions may include retraining the neural network model based on determining whether the packet data set is associated with one or more problem packets. Additionally, or alternatively, performing the one or more actions may include providing, when the packet data set fails to include the one or more problem packets, data indicating that there are no issues with the network or the particular network devices.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, historical packet data identifying packets exchanged between client devices via network devices,
      wherein the historical packet data includes one or more of:
         protocol data associated with the packets, or
         payload data associated with the packets;
   training, by the device, a model based on the historical packet data and to generate a trained model;
   receiving, by the device, packet data identifying particular packets exchanged between particular client devices via a network of particular network devices;
   classifying, by the device, the packet data based on timestamps and protocols associated with the particular packets and to generate classified packet data;
   grouping, by the device, the classified packet data into packet data sets corresponding to packet flows between pairs of the particular client devices;
   selecting, by the device, a packet data set, from the packet data sets, based on one or more filtering criteria;
   processing, by the device, the packet data set, with the trained model, to determine whether the packet data set is associated with one or more problem packets,
      wherein processing the packet data set comprises:
         inputting data associated with the packet data set into the trained model to cause the trained model to output information associated with the one or more problem packets,
      wherein each of the one or more problem packets is associated with one or more of:
         an incorrect packet header, or
         an incorrect packet payload protocol; and
   performing, by the device, one or more actions based on determining whether the packet data set is associated with one or more problem packets.

2. The method of claim 1, further comprising:
   storing the packet data sets in a data structure,
      wherein selecting the packet data set from the packet data sets comprises:
         selecting the packet data set from the packet data sets stored in the data structure.

3. The method of claim 1, wherein performing the one or more actions comprises one or more of:
   identifying, when the packet data set is associated with the one or more problem packets, the network, one of the particular network devices, or one of the particular client devices based on the one or more problem packets;
   providing, when the packet data set is associated with the one or more problem packets, data identifying the one or more problem packets for display; or
   identifying, when the packet data set is associated with the one or more problem packets, one or more causes of problems associated with the one or more problem packets.

4. The method of claim 1, wherein performing the one or more actions comprises one or more of:
   determining, when the packet data set is associated with the one or more problem packets, a modification to the network, one of the particular network devices, or one of the particular client devices based on the one or more problem packets;
   causing, when the packet data set is associated with the one or more problem packets, an autonomous vehicle to be dispatched to service the network or one of the particular network devices; or
   retraining the model based on determining whether the packet data set is associated with one or more problem packets.

5. The method of claim 1, wherein performing the one or more actions comprises:
   providing, when the packet data set fails to include the one or more problem packets, data indicating that there are no issues with the network or the particular network devices.

6. The method of claim 1, further comprising:
   converting the packet data set into a data file that includes data provided in the packet data set,
      wherein processing the packet data set with the trained model comprises:
         processing the data file, with the trained model, to determine whether the packet data set is associated with the one or more problem packets.

7. The method of claim 6, wherein the data file has a packet capture data file format.

8. A device, comprising:
   one or more processors configured to:
      train a model based on historical packet data and to generate a trained model,
         wherein the historical packet data includes one or more of:
            protocol data associated with the packets, or
            payload data associated with the packets;

receive packet data identifying packets exchanged between client devices via a network of network devices;
classify the packet data based on timestamps and protocols associated with the packets and to generate classified packet data;
group the classified packet data into packet data sets corresponding to packet flows between pairs of the client devices;
select a packet data set, from the packet data sets, based on one or more filtering criteria;
process the packet data set with the trained model to determine whether the packet data set is associated with one or more problem packets,
wherein the one or more processors, when processing the packet data set, are configured to:
input data associated with the packet data set into the trained model to cause the trained model to output information associated with the one or more problem packets,
wherein each of the one or more problem packets is associated with one or more of:
an incorrect packet header, or
an incorrect packet payload protocol; and
perform one or more actions based on determining whether the packet data set is associated with one or more problem packets.

9. The device of claim 8, wherein each of the packets is associated with one or more of:
an AppleTalk transaction protocol,
a user datagram protocol (UDP),
a UDP Lite protocol,
a cyclic UDP,
a reliable UDP,
a transaction control protocol (TCP),
a multipath TCP,
a sequenced packet exchange protocol,
a voice over Internet protocol,
a session initiation protocol, or
a real-time transport protocol.

10. The device of claim 8, wherein the one or more processors, when performing the one or more actions, are configured to:
determine that software associated with one of the network devices generates a problem packet;
identify a vendor associated with the one of the network devices; and
provide, to a device associated with the vendor, a notification identifying the one of the network devices, data included in the problem packet, and a problem associated with the problem packet.

11. The device of claim 8, wherein the one or more processors, when performing the one or more actions, are configured to:
determine that hardware associated with one of the network devices generates a problem packet; and
cause a robot or a technician to be dispatched to service the hardware associated with the one of the network devices.

12. A non-transitory computer-readable medium storing instructions, the instructions comprising:
one or more instructions that, when executed by one or more processors, cause the one or more processors to:
train a model based on historical packet data and to generate a trained model,
wherein the historical packet data includes one or more of:
protocol data associated with the packets, or
payload data associated with the packets;
receive packet data identifying packets exchanged between client devices via a network of network devices;
classify the packet data based on timestamps and protocols associated with the packets and to generate classified packet data;
group the classified packet data into packet data sets corresponding to packet flows between pairs of the client devices;
store the packet data sets in a data structure;
retrieve a packet data set, from the packet data sets stored in the data structure, based on one or more filtering criteria;
convert the packet data set into a data file that includes data provided in the packet data set;
process the data file with the trained model to determine whether the packet data set is associated with one or more problem packets,
wherein the one or more instructions, that cause the one or more processors to process the data file, cause the one or more processors to:
input the data file into the trained model to cause the trained model to output information associated with the one or more problem packets,
wherein each of the one or more problem packets is associated with one or more of:
an incorrect packet header, or
an incorrect packet payload protocol; and
perform one or more actions based on determining whether the packet data set is associated with one or more problem packets.

13. The non-transitory computer-readable medium of claim 12, wherein the one or more instructions, that cause the one or more processors to perform the one or more actions, cause the one or more processors to one or more of:
identify, when the packet data set is associated with the one or more problem packets, a cause of a failure in the network, one of the network devices, or one of the client devices based on the one or more problem packets;
provide, when the packet data set is associated with the one or more problem packets, data identifying the one or more problem packets for display; or
identify, when the packet data set is associated with the one or more problem packets, one or more causes of problems associated with the one or more problem packets.

14. The non-transitory computer-readable medium of claim 12, wherein the one or more instructions, that cause the one or more processors to perform the one or more actions, cause the one or more processors to one or more of:
determine, when the packet data set is associated with the one or more problem packets, a modification to the network, one of the network devices, or one of the client devices based on the one or more problem packets;
cause, when the packet data set is associated with the one or more problem packets, an autonomous vehicle to be dispatched to service the network or one of the network devices; or
retrain the model based on determining whether the packet data set is associated with one or more problem packets.

15. The non-transitory computer-readable medium of claim 12, wherein the one or more instructions, that cause the one or more processors to perform the one or more actions, cause the one or more processors to:
- determine that software associated with one of the network devices generates a problem packet;
- identify a vendor associated with the one of the network devices; and
- provide, to a device associated with the vendor, a notification identifying the one of the network devices, data included in the problem packet, and a problem associated with the problem packet.

16. The non-transitory computer-readable medium of claim 12, wherein the one or more instructions, that cause the one or more processors to perform the one or more actions, cause the one or more processors to:
- determine that hardware associated with one of the network devices generates a problem packet; and
- cause a robot or a technician to be dispatched to service the hardware associated with the one of the network devices.

* * * * *